United States Patent [19]
Maruo et al.

[11] 4,438,398
[45] Mar. 20, 1984

[54] POSITION DETECTING SIGNAL GENERATOR

[75] Inventors: Tsunehiro Maruo, Yokohama; Masaomi Inagaki, Yachiyo, both of Japan

[73] Assignee: Sony Corporation, Tokyo, Japan

[21] Appl. No.: 311,185

[22] Filed: Oct. 14, 1981

[30] Foreign Application Priority Data

Oct. 22, 1980 [JP] Japan .................... 55-147706

[51] Int. Cl.³ .................... G01P 3/66; G01P 3/42
[52] U.S. Cl. .................... 324/173; 324/160
[58] Field of Search .................... 310/79–80; 324/163, 165, 166, 168, 173, 174, 160, 178; 340/347

[56] References Cited

U.S. PATENT DOCUMENTS 3,383,574  5/1968  Manteuffel .
3,517,289  6/1970  Brunner .
3,819,268  6/1974  Johnson .
4,096,419  6/1978  Wren .

OTHER PUBLICATIONS

King; "Tachometer Circuits"-IBM Bulletin-vol. 23, No. 3—Aug. 1980—pp. 962-963.

Primary Examiner—Stanley T. Krawczewicz
Assistant Examiner—Jose M. Solis
Attorney, Agent, or Firm—Lewis H. Eslinger; Alvin Sinderbrand

[57] ABSTRACT

Apparatus for generating a signal corresponding to a reference phase of a reference rotor of a motor relative to the stator, includes a field magnet having a plurality of north and south poles mounted on the rotor; a Hall-effect element associated with the field magnet and mounted on the stator for generating a position signal corresponding to the position of the rotor relative to the stator for use in changing-over energization of coils on the stator; a plurality of equally spaced cut-out portions along the periphery of the rotor forming a plurality of equally spaced toothed portions; an optical detector associated with the toothed portions and mounted on the stator for generating a speed signal corresponding to the rotational speed of the rotor relative to the stator; a differentiating circuit for differentiating the position signal to produce a differentiated signal; and an AND gate supplied with the differentiated signal and the speed signal for producing the phase signal corresponding to a reference phase of the rotor relative to the stator.

24 Claims, 23 Drawing Figures

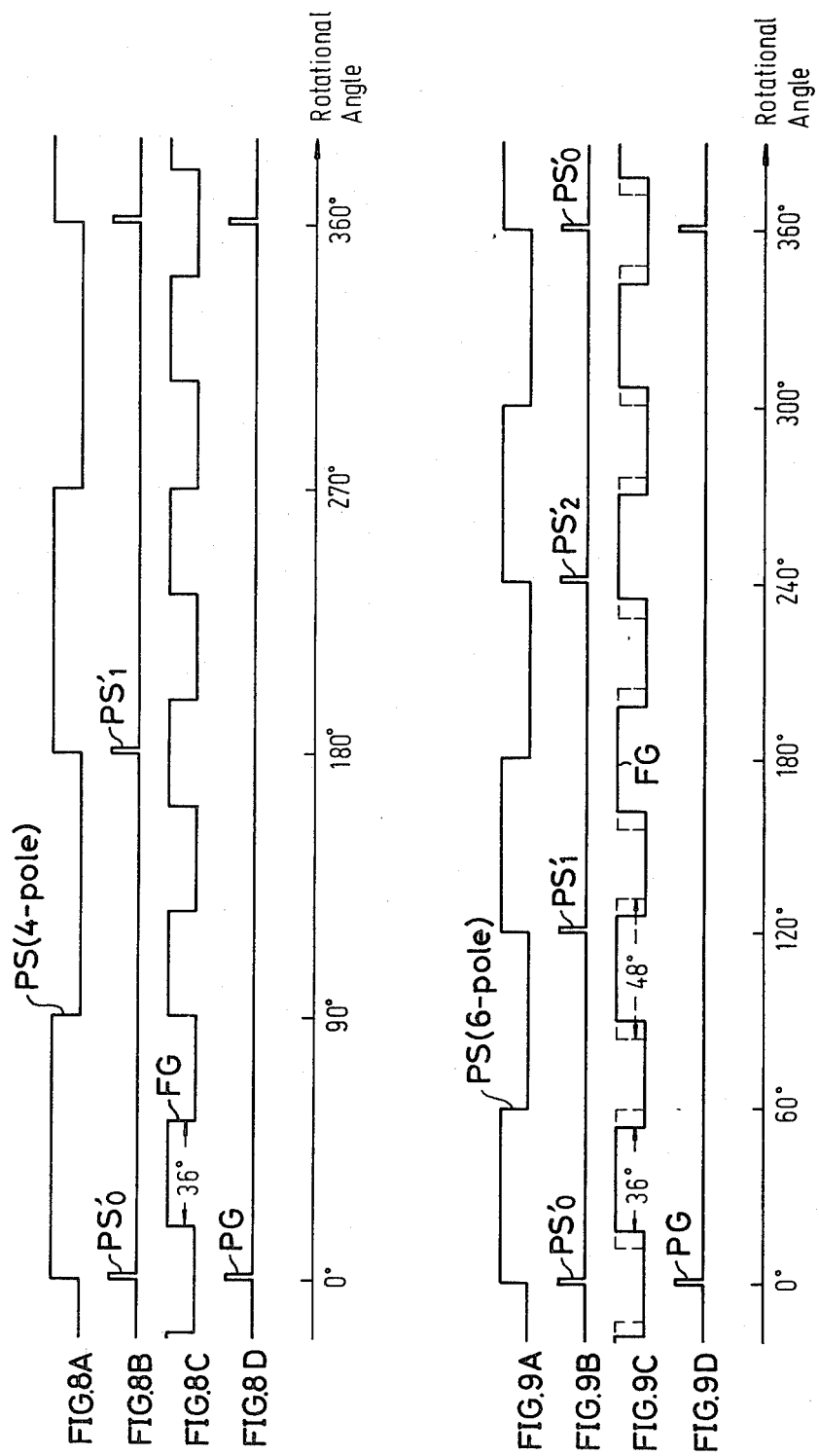

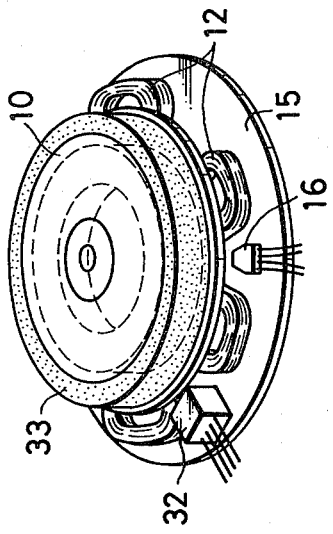
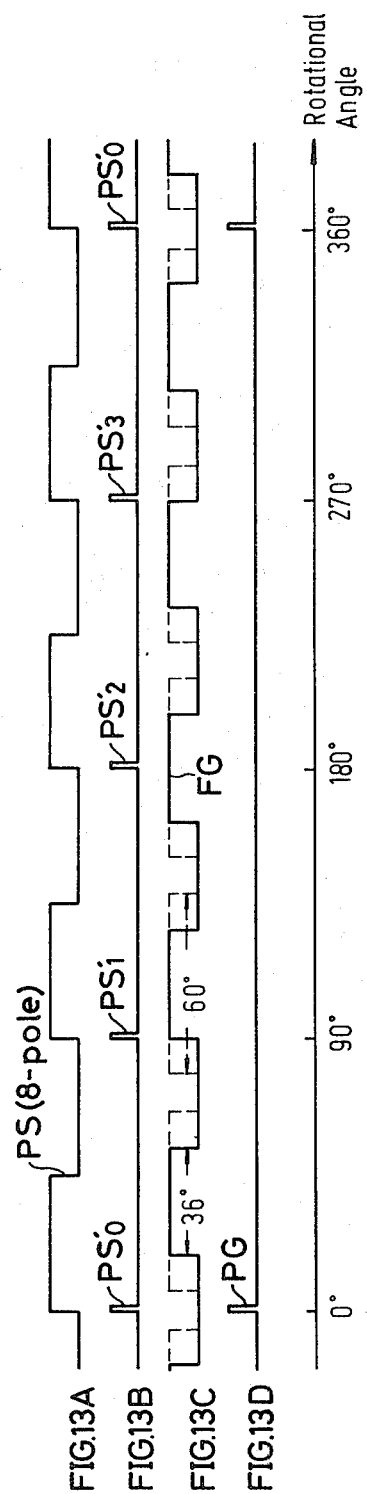

POSITION DETECTING SIGNAL GENERATOR

BACKGROUND OF THE INVENTION

1. Field of the Invention

This invention relates to a position detecting signal generator.

2. Description of the Prior Art

FIG. 1 shows a conventional rotation detecting apparatus, for example, for a rotary drum of a video tape recorder. Generally, such rotation detecting apparatus requires a frequency generator (FG) for control of rotational speed, and a pulse generator (PG) for detecting the rotary phase of the magnetic head. In FIG. 1, the frequency generator is constituted by an FG detecting head 1 and a plurality of magnet pieces 3 fixed on a rotary drum 2 in opposing or facing relation to FG detecting head 1. The pulse generator is constituted by a detecting head 4 and one magnet piece 5 in opposing relation thereto. The outputs of the detecting heads in FIG. 1 are shown in FIG. 2, FIG. 2A showing the PG output of PG detecting head 4, and FIG. 2B showing the FG output of FG detecting head 1.

Thus, two rotation control systems for the FG and PG outputs must be provided in the electronic circuitry. Accordingly, the number of circuit parts becomes large. In addition, the electronic apparatus becomes expensive, and it becomes difficult to make it in a small size. Further, when the rotational position of the rotating body is exactly detected from the rotational position detection signal of FIG. 2A, a zero cross-over point Z must be found, resulting in further complication of the circuit.

A magnetic detecting head is also used in the rotation detecting apparatus of FIG. 1. It is also possible to use a photo-interrupter (light intercepting type) or a photo reflector (light reflecting type) to produce the PG and FG signals in a recording/reproducing apparatus using a floppy disc. However, this apparatus also has the above-described defects.

OBJECTS AND SUMMARY OF THE INVENTION

Accordingly, it is an object of this invention to provide a position detecting signal generator that avoids the above-described difficulties encountered with the prior art.

More particularly, an object of this invention is to provide a position detecting signal generator in which the absolute position of a moving or rotating body can be detected with a simple construction and with high accuracy.

Another object of this invention is to provide a position detecting signal generator in which a rotational speed detecting signal and a rotational position detecting signal can be obtained with a simple construction.

A further object of this invention is to provide a position detecting signal generator which is inexpensive.

A still further object of this invention is to provide a position detecting signal generator which can be made small in size.

In accordance with an aspect of this invention, apparatus for generating a phase signal corresponding to the phase of a movable body relative to a stationary body includes a first position generating medium mounted on the movable body; a second speed signal generating medium mounted on the movable body, different from the second position or speed signal in; a first position detecting member and a second speed signal detecting member arranged in correspondence with the first speed position and second speed signal generating mediums, respectively for producing a position signal and a speed signal corresponding to the position and speed of the movable body relative to the stationary body, respectively an edge detecting circuit for differentiating one of the position signal and speed signal to produce a differentiated signal; and means for generating said phase signal respresentative of the phase of the movable body relative to the stationary body in response to the differentiated signal and the other of the position signal and speed signal.

The above, and other, objects, features and advantages of the present invention will readily become apparent from the ensuing detailed description of illustrative embodiments of the invention which is to be read in connection with the accompanying drawings.

BRIEF DESCRIPTION OF THE DRAWINGS

FIGS. 8A-8D are waveform diagrams used for explaining the operation of the circuit of FIG. 7;

FIGS. 9A-9D are waveform diagrams used for explaining the operation of the circuit of FIG. 7, in which the number of field magnet poles is 6 and the number of FG detecting toothed portions is 5 in the motor of FIG. 3;

FIG. 12 is a schematic perspective view of a motor according to another embodiment of this invention in which the FG signal is detected by a DME; and FIGS. 13A-13D are waveform diagrams used for explaining the operation of the motors of FIGS. 3 and 12, in which number of the field magnet poles is 8 and the number of FG detecting toothed portions is 5.

DETAILED DESCRIPTION OF THE PREFERRED EMBODIMENTS

Figure 1:
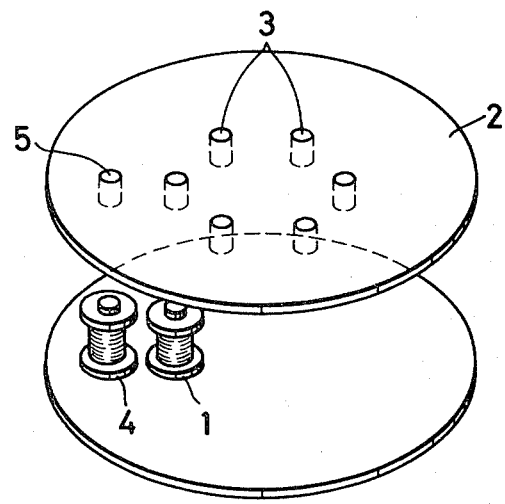
FIG. 1 is a schematic perspective view of a known rotation detecting apparatus for a rotary drum of a video tape recorder.
Figure 2A:
FIGS. 2A and 2B are waveform diagrams of the outputs of the detecting heads in FIG. 1.
Figure 2B:
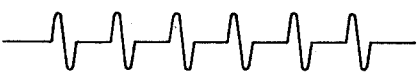
Figure 3:
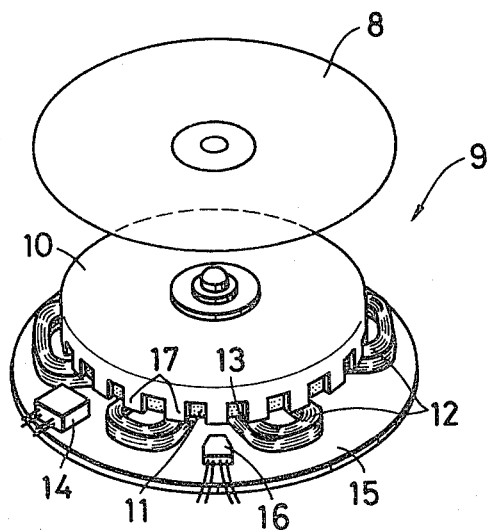
FIG. 3 is a schematic perspective view of a rotation detecting apparatus for a floppy disc recording/reproducing apparatus according to one embodiment of this invention.
Figure 4:
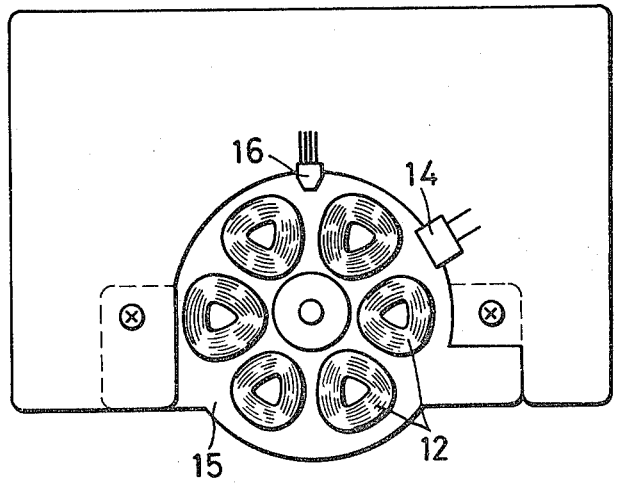
FIG. 4 is a plan view of the stator assembly of the motor shown in FIG. 3.
Figure 5:
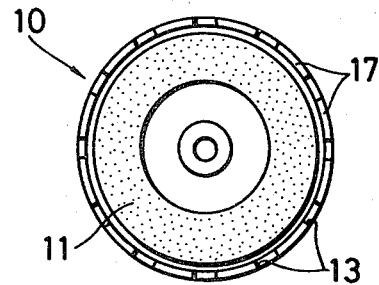
FIG. 5 is a plan view of the rotor assembly of the motor shown in FIG. 3.
Figure 6:
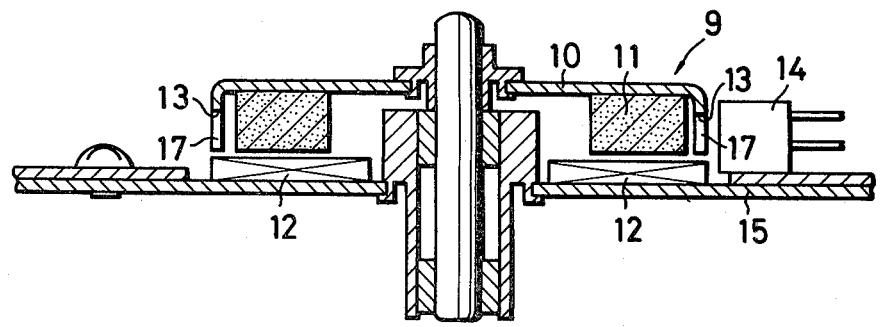
FIG. 6 is a side, cross-sectional view of the motor shown in FIG. 3.

Referring to the drawings in detail, and initially to FIG. 3 thereof, a schematic perspective view of a rotational apparatus of a floppy disc type recording/reproducing apparatus according to a first embodiment of this invention is shown. In this embodiment, the rotational phase detecting signal for the floppy disc is obtained from an FG signal of a rotational speed detecting apparatus and a position detecting signal for the rotor of a brushless motor used for driving the rotational apparatus. FIG. 4 is a plan view of the stator of the motor. FIG. 5 is a plan view of the rotor, and FIG. 6 is a side, cross-sectional view of the motor of FIG. 3.

In FIG. 3, a floppy disc 8 is fixed on a rotor yoke 10 of a drive motor 9, for example, by a magnetic chucking device (not shown). A field magnet 11 is attached on the lower surface of rotor yoke 10 and a plurality of coils 12 are mounted on a stator base plate 15, as shown in FIG. 4, in opposing or facing relation to field magnet 11, the coils being alternately energized to interact with field magnet 11 so as to drive rotor yoke 10. The rotor yoke 10 is preferably plated with chrome. As shown in FIG. 5, cutouts 13 are formed at regular intervals in the circumferential wall of rotor yoke 10 to form toothed portions 17.

A photo-reflector 14 is mounted on stator base plate 15 adjacent the circumferential wall of rotor yoke 10 and consists of a light-emitting element and a light-sensing element. The light-sensing element receives light reflected from toothed portion 17 formed by cutouts 13 of the circumferential wall of rotor yoke 10, and generates a rotational speed detecting signal of a predetermined frequency in response thereto.

Further, a Hall-effect element 16 is mounted on stator base plate 15 for detecting the rotational position of the rotor. Field inversion of field magnet 11 is detected by Hall-effect element 16 to form a so-called "rotor position detecting signal" which is used as an ON-OFF change-over signal for changing-over the energization of the coils 12.

The motor according to this embodiment is a two-phase switching type brushless motor in which one rotor position detecting element is used. In order to avoid a so-called "rotational dead point" in which rotational torque becomes zero during switching, the angular ranges of the N pole and S pole of field magnet 11 are asymmetric with respect to each other. Accordingly, N- and S-poles are formed at regular intervals on the circumferential surface of field magnet 11 (that is, with a duty cycle of 50%) and are used exclusively for position detection.

Figure 7:
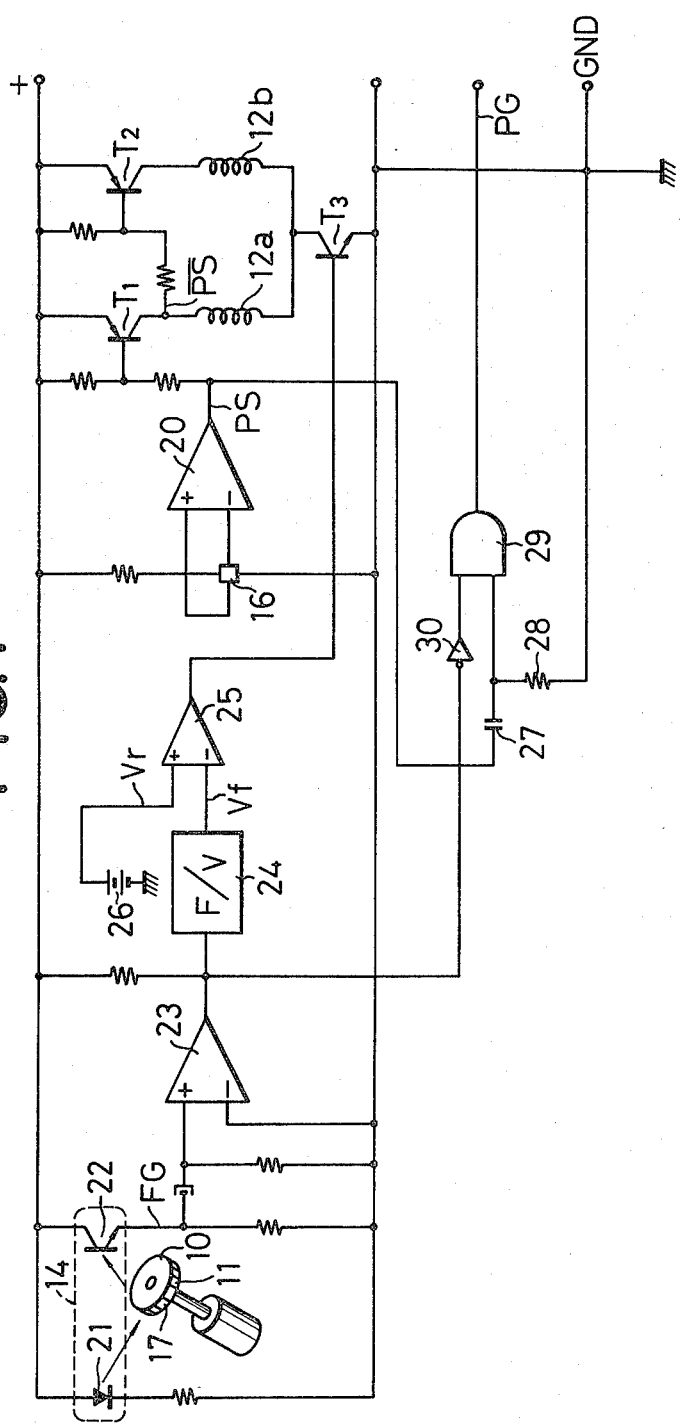
FIG. 7 is a circuit wiring diagram of one embodiment of a drive circuit for the motor shown in FIG. 3, and a circuit for generating a position detecting signal.

Referring now to FIG. 7, one embodiment of a drive circuit and position detecting signal generating circuit for the motor shown in FIGS. 3 to 6, and waveforms (FIG. 8) for explaining the operation of the circuit of FIG. 7 will be described. The number of poles of the field magnet in the motor according to this embodiment is four, and the number of toothed portions 17 for FG detection is five. It is to be appreciated that, although only six coils have been shown in FIGS. 3 and 4 for brevity purposes, corresponding to a six pole arrangement, one of ordinary skill in the art would be able to vary the number of coils, for example, for a four or eight pole arrangement, in view of the disclosure herein with respect to FIGS. 3, 4, 8A–8D and 13A–13D.

In FIG. 7, the output signal of Hall-effect element 16 is supplied to an operational amplifier 20, and a rotor position detecting signal $\overline{PS}$ of two periods for each revolution, as shown in FIG. 8A, is obtained from operational amplifier 20. The signal PS is supplied to the base of a PNP transistor $T_1$, and an A-phase coil 12a connected to the collector of transistor $T_1$ is energized at the lower level portion of signal PS. An inverted signal $\overline{PS}$ at the collector of transistor $T_1$ is supplied to the base of a PNP transistor $T_2$. A B-phase coil 12b connected to the collector of transistor $T_2$ is energized at the lower level portion of signal $\overline{PS}$.

On the other hand, light from a light-emitting diode 21 in photo-reflector 14 is reflected by the toothed portions 17 of rotor 10, and is received by a photo-transistor 22. A frequency detecting signal FG of five periods for each revolution, as shown in FIG. 8C, is obtained from the emitter of photo-transistor 22 and is supplied to the non-inverting input of an operational amplifier 23 where it is amplified and wave-shaped. The output of operational amplifier 23 is supplied to a frequency-voltage converter 24 to be converted to a voltage $V_f$ which is proportional to the rotational speed of the rotor. The voltage $V_f$ is compared with an output voltage $V_r$ of a reference voltage source 26 in a comparator 25. An error output voltage $V_s$ of comparator 25 is supplied as a servo voltage to the base of an NPN control transistor $T_3$ to control currents flowing through coils 12a and 12b for maintaining the rotor speed constant.

The relative positions of the poles of field magnet 11 to toothed portions 17 of rotor 10 in FIG. 5, and of Hall-effect element 16 for rotor position detection to the photo-reflector for FG detection are determined so that one leading edge of the PS signal during each revolution corresponds to one lower level portion of the FG signal, as shown in FIGS. 8A and 8C.

The output of operational amplifier 20 is also supplied to a differentiating circuit consisting of a capacitor 27 and a resistor 28, and is differentiated thereby, to produce a differentiation, signal PS, as shown in FIG. 8B, in which the position of the leading edge of the PS signal is detected and which is supplied to one input of an AND gate 29. It is to be appreciated that, since the negative pulse of differentiation signal PS' cannot pass through AND gate 29 which follows the differentiating circuit it is not shown in FIG. 8B. On the other hand, the output of operational amplifier 23, which constitutes the FG signal is supplied through an inverter 30 to another input of AND gate 29. In this manner, one rotational phase detecting signal PG for each revolution is obtained from AND gate 29, as shown in FIG. 8D. In other words, although a differentiation pulse $PS_1'$ of the PS signal is generated at a rotational angle of 180°, the level of the FG signal is then high, as shown in FIG. 8C. Accordingly, since the FG signal is inverted and then supplied to AND gate 29, the position of the leading edge of the PS signal at the rotational angle of 180° is not extracted as the PG signal from AND gate 29.

The output of AND gate 29 is fed as the PG signal to a control circuit (not shown) for controlling the recording/reproducing operations of floppy disc 8. It is to be appreciated that FG signal, shown in FIG. 8, may be high at the rotational angle of 0°. In such case, inverter 30 is not required in the circuit of FIG. 7. Further, a magnetic sensing element such as a DME (Divider-type Magnetoresistive Element) or an electromagnetic sensing element may be used in place of photo-reflector 14 in FIG. 7. However, the number of toothed portions 17 for the FG signal must be an integer that is greater than three, but not divisible by two. Also, an optical system may be used in place of Hall-effect element 16.

Referring now to FIG. 9, other waveforms are shown for the case where the number of poles of field magnet 11 and the number of toothed portions 17 for FG detection are six and five in the motor, respectively. Also, in this case, the differentiation signal $PS_0'$ representative of the leading edge of the rotor position detecting signal PS at the rotational angle of 0° is adjusted so as to correspond to the lower level portion of the FG signal. One rotational phase detecting signal PG for each revolution is obtained, as shown in FIG. 9D. Differentiation signals PS$_1$′ and PS$_2$′ at the rotational angles of 120° and 240° correspond to higher level portions of the FG signal, and accordingly are not extracted as the PG signal from AND gate 29. However, an angular distance between the differentiation signal PS$_1$′ or PS$_2$′ and the trailing or leading edge of the FG signal is only about 12°. Thus, there is little clearance for omitting differentiation signals PS$_1$′ and PS$_2$′ from the output of AND gate 29. For sufficient clearance, the width of the FG detecting toothed portions 17 may be increased from an angle of 36° (with a ratio to cut-outs 13 being equal to 1:1) to an angle of 48° (with a ratio to cut-outs 13 being equal to 2:1), as shown by the dashed lines in FIG. 9C.

Figure 10:
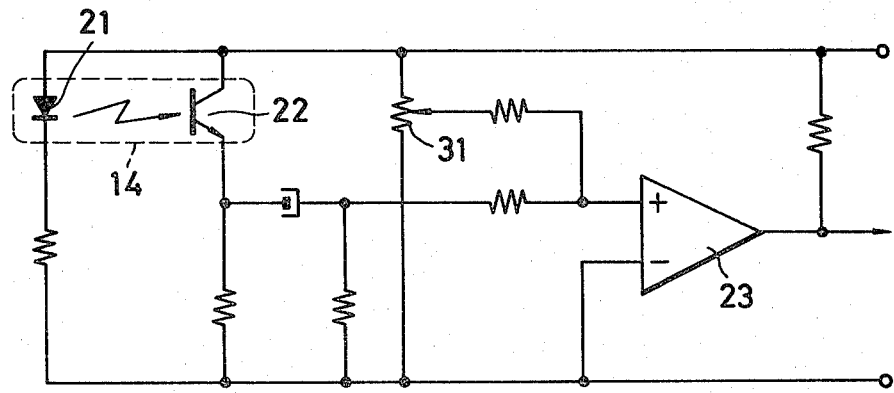
FIG. 10 and FIG. 11 are circuit-wiring diagrams showing modifications of the FG detecting portions of the circuit of FIG. 7 in which the duty cycles of the FG signals are electronically varied.
Figure 11:
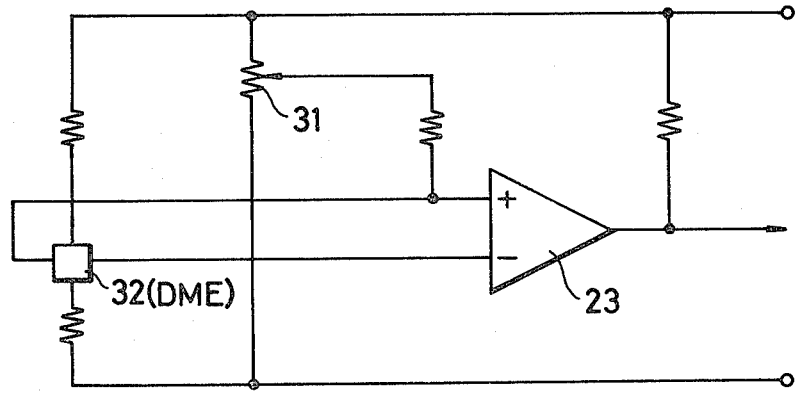

As described above, the duty cycle of the FG signal can be changed with the width of the toothed portions 17 for FG detection. Further, the duty cycle can be changed in such a manner that an offset voltage of operational amplifier 23 receiving the output of photo-reflector 14 is changed by a variable resistor 31, as shown in FIG. 10. When the FG signal is detected by a magnetic sensing element, such as DME (Divider type Magnetoresistance Element), the width of each magnetic pole as an object to be detected is changed to obtain the desired duty cycle of the FG signal. Alternately, an offset voltage of operational amplifier 23, in response to a received output of DME 32, is changed by a variable resistor 31, as shown in FIG. 11.

Referring now to FIG. 12, a schematic perspective view of a motor according to another embodiment of this invention will now be described, in which a FG signal is detected by a DME. In this motor, an FG magnetic ring 33 is fixed on the outer circumferential surface of rotor yoke 10, and a DME 32 is mounted on the stator, in opposing or facing relation to FG magnetic ring 33, and adjacent to the latter.

In the example of FIG. 9, the number of FG detection toothed portions 17 may be more than three, the number being indivisible by three (4, 5, 7, 8, 10 and so on), and the duty cycle of the higher level portion to the lower level portions of the FG signal may be other than 2:1.

In the example of FIG. 13, the number of field magnet poles 11 is eight, and the number of FG detection toothed portions 17 is chosen as five. As shown in FIG. 13D, the rotary phase detecting signal PG is produced at the rotational angle 0° at which the leading edge of the position detecting signal PS corresponds to the lower level portion of the FG signal. However, the intervals between the differentiation signals PS$_1$′ (at the rotational angle of 90°) and PS$_3$′ (at the rotational angle of 270°) from the position detecting signal PS, and the edges of the FG signals, are nearly equal to zero, respectively. Thus, because of the difficulty in accurately assembling the motor, there is the possibility that more than two PG signals are generated for each revolution. In order to avoid such possibility, the duty cycle of the FG signal, as shown by the dotted lines in FIG. 13C, is increased from 1:1 (36°) to 5:1 (60°), in order to ensure that only one PG signal is obtained for each revolution of the motor. With a duty cycle of 5:1, the angular clearance for extracting the differentiation signal PS$_0$′ is equal to the angular clearances for omitting the differentiation signals PS$_1$′ and PS$_3$′. It is to be appreciated that the duty cycle may be other than 5:1.

In the above embodiments, the PG signal is detected obtained from the basis of the differentiation signal on the PS signal. Accordingly, in contrast to conventional PG signal detecting systems, there is no requirement to find a zero cross-over point of the detecting signal. In this manner, detection is very accurate, and the circuit construction is very simple.

In the above embodiments, a two-phase switching type brushless motor has been described. However, this invention is not limited to such motor, and may be applied, for example, to a two-phase reversible switching type brushless motor, a three-phase reversible switching type brushless motor, a three-phase unidirectional switching type brushless motor, and a two-phase sinusoidal wave drive brushless motor. Further, this invention may be applied to a DC brush motor. In such latter motor, the timing for change-over of coil energization is detected, and a PG signal is produced from the combination of the detected timing and an FG signal.

In the above embodiments, the number of field magnet poles that have been discussed is 4, 6 and 8. It is to be appreciated, of course, that this invention may be applied to a motor having more than 8 field magnet poles.

Further, this invention is not limited to a rotating body as the detecting object for the PG signal, but may be applied to a swinging body or a linearly moving body, such as a linear motor.

In this invention, as above described, first and second signal generating means for generating first and second signals, such as FG detecting toothed portions 17 and a rotor position detecting magnet, are arranged on a rotating body, such as the rotor of the motor, or a moving body, and first and second signal detecting means, such as a photo-reflector 14 and a Hall-effect element 16 are arranged in correspondence with the first and second signal generating means, respectively. The first and second signals having different periods. One of the outputs of the first and second signal detecting means, such as the rotor position detecting signal PS, which has a longer period than the other of the outputs of the first and second signal detecting means, is differentiated. The logical product of the differentiated one by the other is used to generate the absolute position detecting signal (rotary phase detecting signal PG in the above embodiment). Accordingly, it is unnecessary to provide a special absolute position detecting means and a special signal detector on a rotating body or a moving body with this invention. In other words, the existing signal detecting system can be utilized to obtain the absolute position detecting signal according to this invention. In contrast to conventional systems, there is no need to find a zero-cross point of the detecting signal. Accordingly, the absolute position detecting signal can be obtained with a simple circuit construction and with high accuracy, the number of parts can be reduced, and the apparatus can be made smaller in size and thus, less expensive.

It is to be appreciated that, for brevity purposes only, only position signal PS has been shown to be differentiated and supplied to AND gate 29, along with the speed signal FG, to produce the phase signal PG corresponding to the phase of the rotor relative to the stator. However, as an alternative, speed signal FG may be differentiated and supplied, along with position signal PS, to AND gate 29 to produce the phase signal PG. As previously discussed, however, in a preferred embodiment of this invention, the signal to be differentiated should have a longer period than the other signal. Application of the present invention in the alternative mode in which speed signal FG is differentiated is within the realm of one of ordinary skill in the art for all of the embodiments of this invention in view of the disclosure herein.

Further, for brevity purposes only, although photo-reflector 14 has been shown only on stator 15 and toothed portions 17 only on rotor 10, these elements may be reversed, that is, toothed portions 17 may be formed on stator 15 and photo-reflector formed on rotor 10. In like manner, Hall-effect element 16 may be formed on rotor 10 and field magnet 11 may be formed on stator 15. In the latter case, since field magnet 11 is also used for drive purposes, the coils would be arranged on rotor 10 opposing field magnet 11. This reversal of elements would be well within the realm of one skilled in the art for all of the embodiments of this invention in view of the disclosure herein.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for generating a phase signal corresponding to a reference phase of a movable body relative to a stationary body, comprising:
   position signal generating means associated with at least one of said movable body and said stationary body for generating a position signal corresponding to the position of said movable body relative to said stationary body;
   speed signal generating means associated with at least one of said movable body and said stationary body for generating a speed signal corresponding to the speed of movement of said movable body relative to said stationary body;
   differentiating means for differentiating one of said position signal and said speed signal to produce a differentiated signal; and
   phase signal generating means for generating said phase signal corresponding to a reference phase of said movable body relative to said stationary body in response to said differentiated signal and the other of said position signal and said speed signal.

2. Apparatus according to claim 1; in which said position signal generating means inclues a position signal generating medium mounted on one of said movable body and said stationary body, and position signal detecting means mounted on the other of said movable body and said stationary body and associated with said position signal generating medium for generating said position signal.

3. Apparatus according to claim 2; in which said position signal generating medium includes magnet means having a plurality of poles and said position signal detecting means includes Hall-effect means for producing said position signal in response to relative movement between said magnet means and said Hall-effect means.

4. Apparatus according to claim 3; in which said movable body includes a rotor of a motor and said stationary body includes a stator of said motor, and said magnet means is mounted on said rotor and said Hall-effect means is mounted on said stator.

5. Apparatus according to claim 4; in which said motor is a DC brushless motor.

6. Apparatus according to claim 1; in which said speed signal generating means includes a speed signal generating medium mounted on one of said movable body and said stationary body, and speed signal detecting means mounted on the other of said movable body and said stationary body and associated with said speed signal generating medium for generating an output signal corresponding to the speed of movement of said movable body relative to said stationary body.

7. Apparatus for generating a phase signal corresponding to a reference phase of a movable body relative to a stationary body, comprising:
   position signal generating means associated with at least one of said movable body and said stationary body for generating a position signal corresponding to the position of said movable body relative to said stationary body;
   speed signal generating means associated with at least one of said movable body and said stationary body for generating a speed signal corresponding to the speed of movement of said movable body relative to said stationary body, said speed signal generating means including a speed signal generating medium mounted on one of said movable body and said stationary body and having a plurality of spaced light reflecting portions, and speed signal detecting means mounted on the other of said movable body and said stationary body and associated with said speed signal generating medium for generating an output signal corresponding to the speed of movement of said movable body relative to said stationary body, said speed signal detecting means including optical detecting means for producing said output signal in response to relative movement between said spaced light reflecting portions and said optical detecting means;
   differentiating means for differentiating one of said position signal and said speed signal to produce a differentiated signal; and
   phase signal generating means for generating said phase signal corresponding to a reference phase of said movable body relative to said stationary body in response to said differentiated signal and the other of said position signal and said speed signal.

8. Apparatus according to claim 7; in which said movable body includes a rotor of a motor and said stationary body includes a stator of said motor, and said spaced light reflecting portions are located on a circumferential portion of said rotor and said optical detecting means is mounted on said stator.

9. Apparatus according to claim 8; in which said motor is a DC brushless motor.

10. Apparatus for generating a phase signal corresponding to reference phase of a movable body relative to a stationary body, comprising:
    position signal generating means associated with at least one of said movable body and said stationary body for generating a position signal corresponding to the position of said movable body relative to said stationary body;
    speed signal generating means associated with at least one of said movable body and said stationary body for generating a speed signal comprised of a plurality of successive speed pulses and corresponding to the speed of movement of said movable body relative to said stationary body said speed signal generating means including a speed signal generating medium mounted on one of said movable body and said stationary body, speed signal detecting means mounted on the other of said movable body and said stationary body and associated with said speed signal generating medium for generating an output signal corresponding to the speed of movement of said movable body relative to said stationary body, operational amplifier means having an input supplied with said output signal and an output for generating said speed signal in response to said output signal from said speed signal detecting means, and offset means for changing the duty cycle of said plurality of successive speed pulses of said speed signal;

differentiating means for differentiating one of said position signal and said speed signal to produce a differentiated signal; and phase signal generating means for generating said phase signal corresponding to a reference phase of said movable body relative to said stationary body in response to said differentiated signal and the other of said position signal and said speed signal.

11. Apparatus for generating a phase signal corresponding to a reference phase of a movable body relative to a stationary body, comprising:

position signal generating means associated with at least one of said movable body and said stationary body for generating a position signal corresponding to the position of said movable body relative to said stationary body;

speed signal generating means associated with at least one of said movable body and said stationary body for generating a speed signal corresponding to the speed of movement of said movable body relative to said stationary body, in which one of said position signal and said speed signal has a period greater than the period of the other of said position signal and said speed signal;

differentiating means for differentiating one of said position signal and said speed signal to produce a differentiated signal; and phase signal generating means for generating said phase signal corresponding to a reference phase of said movable body relative to said stationary body in response to said differentiated signal and the other of said position signal and said speed signal.

12. Apparatus according to claim 11; in which said position signal is comprised of a plurality of successive position pulses and said speed signal is comprised of a plurality of successive speed pulses, and said movable body includes a rotor of a motor and said stationary body includes a stator of said motor.

13. Apparatus according to claim 12; in which said position pulses and said speed pulses each include leading and trailing edges, and only one of a predetermined one of said leading and trailing edges of one of said position pulses and speed pulses corresponds to a period in which the other of said position pulses and speed pulses is at a predetermined one of a high and low level.

14. Apparatus according to claim 13; in which only one leading edge of said position pulses corresponds to a period in which a speed pulse is at a predetermined low level.

15. Apparatus according to claim 13; in which said phase signal generating means includes logical product means for generating said phase signal in response to the logical product of the differentiated signal corresponding to said only one of a predetermined one of said leading and trailing edges of one of said position pulses and speed pulses, and the other of said position pulses and speed pulses.

16. Apparatus according to claim 12; in which said position signal generating means includes magnet means having four poles and being mounted on one of said rotor and said stator, and said speed signal includes more than three pulses for each revolution of said rotor relative to said stator, the number of pulses of said speed signal for each revolution of said rotor relative to said stator not being a multiple of two.

17. Apparatus according to claim 16; in which said speed signal includes five pulses for each revolution of said rotor relative to said stator.

18. Apparatus according to claim 12; in which said position signal generating means includes magnet means having six poles and being mounted on one of said rotor and said stator, and said speed signal includes more than three pulses for each revolution of said rotor relative to said stator, the number of pulses of said speed signal for each revolution of said rotor relative to said stator not being a multiple of three.

19. Apparatus according to claim 18; in which said speed signal includes five pulses for each revolution of said rotor relative to said stator.

20. Apparatus according to claim 19; in which said plurality of successive speed pulses of said speed signal have a duty cycle in the range from one-half to two-thirds.

21. Apparatus according to claim 12; in which said position signal generating means includes magnet means having eight poles and being mounted on one of said rotor and said stator, and said speed signal includes five pulses for each revolution of said rotor relative to said stator.

22. Apparatus according to claim 21; in which said plurality of successive speed pulses of said speed signal have a duty cycle in the range from one-half to five-sixths.

23. Apparatus for generating a phase signal corresponding to a reference phase of a movable body relative to a stationary body, comprising:

position signal generating means associated with at least one of said movable body and said stationary body for generating a position signal corresponding to the position of said movable body relative to said stationary body;

speed signal generating means associated with at least one of said movable body and said stationary body for generating a speed signal corresponding to the speed of movement of said movable body relative to said stationary body;

differentiating means for differentiating one of said position signal and said speed signal to produce a differentiated signal; and phase signal generating means for generating said phase signal corresponding to a reference phase of said movable body relative to said stationary body in response to said differentiated signal and the other of said position signal and said speed signal, said phase signal generating means including logical product means for generating said phase signal in response to the logical product of the differentiated signal and the other of said position signal and said speed signal.

24. Apparatus according to claim 23; in which said phase signal generating means includes inverter means for inverting said other of said position signal and said speed signal to produce an inverted signal, and said logical product means includes AND gate means having a first input supplied with said inverted signal, a second input supplied with said differentiated signal, and an output for generating said phase signal in response to said inverted signal and said differentiated signal.

* * * * *